(No Model.)

S. S. ARNOLD.
AXLE BEARING.

No. 461,728. Patented Oct. 20, 1891.

Witnesses
J. Edw. Maybee
H. G. McMillan.

Inventor
Samuel S. Arnold
by Donald C. Ridout & Co.
Attys.

UNITED STATES PATENT OFFICE.

SAMUEL S. ARNOLD, OF TORONTO, CANADA.

AXLE-BEARING.

SPECIFICATION forming part of Letters Patent No. 461,728, dated October 20, 1891.

Application filed March 5, 1891. Serial No. 383,814. (No model.)

*To all whom it may concern:*

Be it known that I, SAMUEL STEPHEN ARNOLD, commercial traveler, of the city of Toronto, in the county of York, Province of Ontario, Canada, have invented certain new and useful Improvements in Axle-Bearings, of which the following is a specification.

The object of the invention is to design an axle-bearing for carriages, cars, wagons, and other vehicles in which the least possible friction will be produced; and it consists, essentially, of an axle having a cupped collar formed on the inside of its bearing, on which is loosely fitted a journal-box having on its inner end a cupped hub designed to fit in the cupped collar on the axle, forming an annular closed recess around the axle to receive hard balls, an annular closed recess being formed between the outer end of the journal-box and a cupped nut screwed onto the end of the axle, the said annular recess being filled with hard balls, which, with the hard balls on the inner end of the journal-box, support the weight, and are lubricated by the lubricant contained within the space between the body of the journal-box and the axle, substantially as hereinafter more particularly explained and then definitely claimed.

Figure 1:
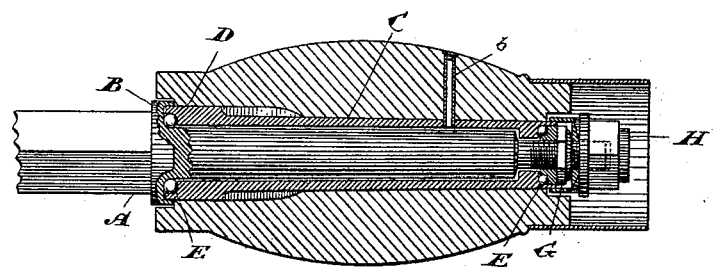
Figure 2:
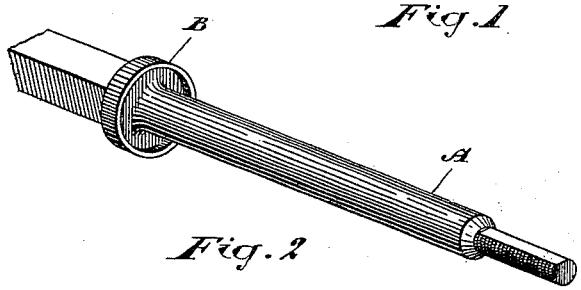
Figure 3:
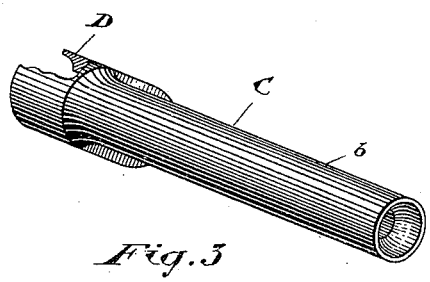
Figure 4:
Figure 5:
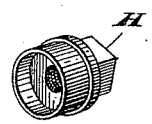

Figure 1 is a sectional view having my improved axle applied to the hub of an ordinary vehicle. Fig. 2 is a perspective detail of my improved axle. Fig. 3 is a perspective detail of the journal-box. Fig. 4 is a perspective detail of the inner nut. Fig. 5 is a perspective view of the outer nut.

The object of my invention is to produce as nearly as possible an absolutely frictionless axle-bearing which will remain lubricated for an indefinite period without requiring any personal attention, and in carrying out my invention all the details necessary to accomplish the desired end have been carefully attended to.

In the drawings, A represents an axle on which a collar B is formed. The inner face of this collar is cupped or recessed.

C is a journal-box loosely fitted on the axle A and having a hub D formed on its inner end, designed to fit into a cupped or recessed collar B. The inner face of the hub D is cupped or recessed to receive the hard balls E, a sufficient number of said balls E being provided to fill the annular recess formed around the axle by the cupped or recessed hub D. The outer end of the journal-box C is cupped, so as to form an annular recess, which is filled with hard balls F. These balls F are held in place by the cupped nut G, which is screwed onto the end of the axle A into the recess formed on the end of the journal-box C. It will be noticed that a projection *a* is formed on the inner face of the nut G, which projection is intended to protect the screw on the end of the axle A and complete the annular recess in which the hard balls F are contained.

The journal-box C is bored larger than the axle A, so that there will be a space between the said axle and the inside of the journal-box C when the said journal-box is supported by the hard balls E and F. This space forms a reservoir for the oil or other lubricant required for the hard balls E and F, and will hold sufficient to lubricate the ball-bearings for an indefinite period. *b* is an oil-passage through which the lubricant may be poured into the space around the axle. This oil-passage is of course kept closed by a proper stopper. As before stated, the hub D on the journal-box C fits into the cupped collar B, which collar forms a cap to prevent sand and dirt from entering the annular recess containing the balls E. With a view of providing similar protection for the annular recess containing the hard balls F, I screw a cap H onto the end of the axle A, the said cap overlapping the end of the journal-box C, while the head of the cap butts against the nut G, thereby forming a jam-nut to securely lock the nut G and prevent it turning. From this description it will be seen that I produce an axle-bearing which is practically frictionless, as the entire weight of the load is supported by hard balls loosely arranged in recesses in such a manner that they will revolve freely and independently during the revolving of the wheel or axle.

What I claim as my invention is—

1. A collar B, formed on the axle A and cupped or recessed to receive the hub D, formed on the end of the journal-box C, hard balls E, placed in the annular recess formed in the hub D, in combination with a cupped nut G, screwed onto the end of the axle A and having a projection $a$ to complete the annular closed recess formed between the cupped end of the journal-box C and the said nut, into which recess the hard balls F are inserted, substantially as and for the purpose specified.

2. A journal-box C, having a cupped end close to the cupped nut G, the annular closed recess formed between the two being filled with hard balls F, in combination with a cap H, screwed onto the end of the axle A to overlap the end of the journal-box C and butt against the nut G, substantially as and for the purpose specified.

Toronto, February 12, 1891.

SAMUEL S. ARNOLD.

In presence of—
    CHARLES C. BALDWIN,
    JOHN E. CAMERON.